United States Patent [19]
Baker

[11] Patent Number: 5,636,670
[45] Date of Patent: Jun. 10, 1997

[54] OIL/LIQUID RECOVERY SYSTEM

[76] Inventor: Tony L. Baker, 530 S. Leonard #64, Lima, Ohio 45804

[21] Appl. No.: 463,726

[22] Filed: Jun. 5, 1995

[51] Int. Cl.$^6$ ............................................. B65B 1/04
[52] U.S. Cl. ........................ 141/106; 141/98; 141/364; 141/375
[58] Field of Search ................. 141/98, 106, 364, 141/375

[56] References Cited

U.S. PATENT DOCUMENTS

| | | |
|---|---|---|
| 2,728,488 | 12/1955 | Hankins ................................. 141/106 |
| 4,228,928 | 10/1980 | Hocker et al. . | |
| 4,832,095 | 5/1989 | Bonnell ................................. 141/106 |
| 4,881,650 | 11/1989 | Bartz ................................. 141/98 X |
| 5,071,002 | 12/1991 | Bradley . | |
| 5,080,150 | 1/1992 | Deadwyler, Jr. . | |
| 5,146,957 | 9/1992 | Belokin, Jr. et al. . | |
| 5,238,146 | 8/1993 | Thorne, Jr. . | |
| 5,325,898 | 7/1994 | Forgnone ................................. 141/106 |
| 5,477,897 | 12/1995 | Scofield ................................. 141/106 X |
| 5,503,246 | 4/1996 | Raboin et al. ........................ 141/98 X |
| 5,522,437 | 6/1996 | Blackburn ................................. 141/106 |
| 5,540,264 | 7/1996 | Harp ................................. 141/106 |

*Primary Examiner*—J. Casimer Jacyna
*Attorney, Agent, or Firm*—Michael I. Kroll

[57] ABSTRACT

An oil/liquid recovery system comprising a structure for draining from inverted bottles some oil/liquid residue remaining in the bottles. A component is for collecting the oil/liquid residue existing from the draining structure for future disposal thereof.

1 Claim, 2 Drawing Sheets

OIL/LIQUID RECOVERY SYSTEM

BACKGROUND OF THE INVENTION

1. Field of the Invention The instant invention relates generally to support devices for containers and more specifically it relates to an oil/liquid recovery system.

2. Description of the Prior Art

Numerous support devices for containers have been provided in prior art. For example, U.S. Pat. Nos. 4,228,928 to Hocker et al.; 5,071,002 to Bradley; 5,080,150 to Deadwyler, Jr.; 5,146,957 to Belokin, Jr. et al. and 5,238,146 to Thorne, Jr. all are illustrative of such prior art. While these units may be suitable for the particular purpose to which they address, they would not be as suitable for the purposes of the present invention as heretofore described.

BOTTLE WITH A CLIP FOR SUSPENDING THE BOTTLE IN INVERTED POSITION

U.S. Pat. No. 4,228,928

A bottle suspending device primarily for a toilet cleaner dispenser bottle for use in a toilet tank. A pivotal member is received in a recess of the bottle's sidewall when stored and is wingable outwardly to an extended position for resting over the top of the toilet tank wall when the bottle is inverted. The pivotal member has a pair of protruding nipples which are press fit upon assembly onto a pair of corresponding sockets in the recess of the bottle wall, so that the pivotal member rotates from its stored position through about 90 degrees to its extended position along a horizontal pivot axis near the upper end of the suspended inverted bottle. A pair of stop ribs on the pivotal member near the pivot axis abut against the dispenser bottle walls when the pivotal member is extended, to prevent rotation beyond the extended position, and structure associated with the recess provides further protection against over-pivoting. A lip at the other end of the pivotal member grips the edge of the toilet tank wall, to maintain the bottle in its intended inverted position.

INVERTIBLE HOLDER FOR CONTAINERS

U.S. Pat. No. 5,071,002

A multi-sides invertible holder for beverage containers or the like comprises a hollow receptacle with a plurality of pairs of flat sides. A preferred embodiment is a hollow cube configuration having six flat sides. Four sides have holes through side walls; one side has a slot extending the length of the side wall; and another side has a hole through the side wall and a slot extending radially outward from the hole, and another side has a solid side wall. In use, the holder sits on a generally level surface and may be inverted such that any one of the side walls is on the top side to slideably receive a beverage container or other open top receptacle, while the opposed bottom flat surface provides a stable supporting base. The invertible holder provides sufficient stability to prevent tipping or spilling the contents of the container. The plurality of apertured sides allow the holder to accommodate various sizes and shapes of beverage containers including cylindrical, tapered, or square beverage containers, or containers having handles.

CONDIMENT BOTTLE DRAINING BASKET

U.S. Pat. No. 5,080,150

Condiment bottle draining baskets are housewares that allow consumers to drain up to five percent of catsup, thick salad dressing, barbecue sauce, et. that otherwise can remain stuck in the bottom of bottles. These baskets let consumers invert and fully drain thick liquid condiment bottles so the product flows into the neck and against the inside of the cap ready for immediate use. In the preferred embodiment two baskets flex and hold small, medium, and large household size condiment bottles in an inverted position, one bottle per basket. These wide based baskets can then be placed on counters, in refrigerator doors, and on the dining table. As much as five percent of household thick liquid condiments can be reclaimed saving money and, ultimately, reducing the total number of containers thrown into landfills.

NESTABLE CONTAINER AND METHOD FOR DISPENSING AND DRAINING LIQUID THEREFROM

U.S. Pat. No. 5,146,957

A tapered liquid container which is nestable with other like empty containers and a collector for receiving empty containers in nested relationship. The container has a tapered side wall, a large bottom end, and a small top dispensing end. A closable large bottom opening and a closable small top opening is formed in the bottom and top ends, respectively. A bottom closure seals the bottom opening and is removable when dispensing the liquid. A top closure is provided for sealing the top opening and is removable to permit liquid to be emptied. The collector includes an upper portion having a tapered socket for receiving an inverted empty container body with the top and bottom closures removed to permit draining of residual liquid. The tapered socket holds the container securely to permit successive containers to be inserted into the open bottom end, when the bottom closure is removed of a preceding container. The containers are thus nested for consolidation and draining of residual liquid. A receptacle is provided for receiving and holding drained residual liquid.

SUPPORT DEVICE TO FACILITATE EMPTYING OF CONTAINERS

U.S. Pat. No. 5,238,146

A support device for insertion beneath a portion of one end of a drum, configured for stable engagement with a chime or a groove so that the drum may be reliably and securely supported in a tilted position for an extended period of time to facilitate emptying of residue therefrom. The device preferably has a generally wedge-shaped configuration with an upper surface which slopes downward from back to front. the device may have a curved channel to receive a drum chime, and/or one or more ears for insertion in a peripheral end wall groove. The device may be employed to facilitate either pumping of residue with the drum in an upright position, or draining of the residue through an opening in the lid by inverting the drum. In the latter case, to facilitate proper placement of drums of the type having a pair of spouts at diametrically opposed locations on the lid, an opening is provided in the upper wall of the device to accommodate one of the spouts. The device may also be equipped with stabilizing protrusions on its back wall so that it is capable of use in a position in which the back wall serves as the base, with the forward end of the device inserted in an end wall groove on the drum.

SUMMARY OF THE INVENTION

A primary object of the present invention is to provide an oil/liquid recovery system that will overcome the shortcomings of the prior art devices.

Another object is to provide an oil/liquid recovery system that will drain off from inverted bottles some oil/liquid residue and collect the oil/liquid residue for future disposal thereof.

An additional object is to provide an oil/liquid recovery system when placed upon a horizontal support surface or mounted upon a vertical flat wall to drain off and collect the oil/liquid residue, will minimize the wasting of the oil/liquid residue, since the oil/liquid residue and the bottles can both be recycled.

A further object is to provide an oil/liquid recovery system that is simple and easy to use.

A still further object is to provide an oil/liquid recovery system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
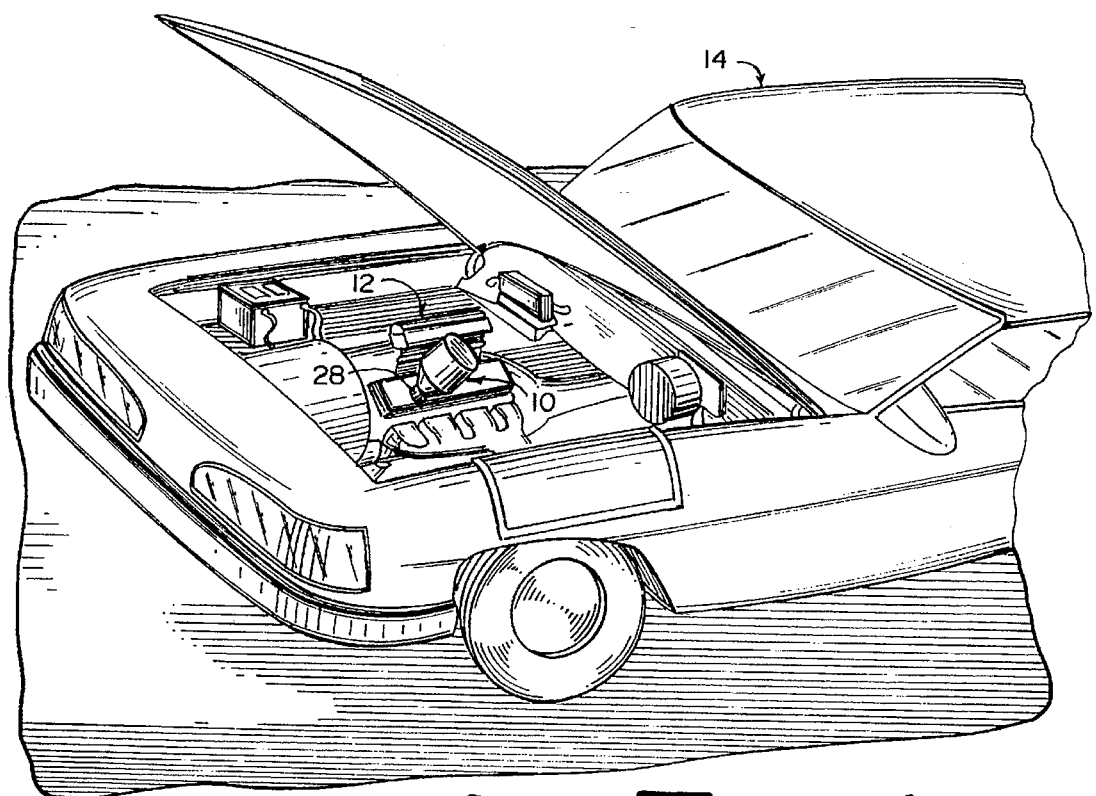
FIG. 1 is a perspective view showing an inverted oil bottle dispensing oil into an engine of a motor vehicle.

Turning now descriptively to the drawings, in which similar reference characters denote similar elements throughout the several views, FIG. 1 shows an inverted bottle 10, being an oil container, dispensing oil into an engine 12 of a motor vehicle 14.

Figure 2:
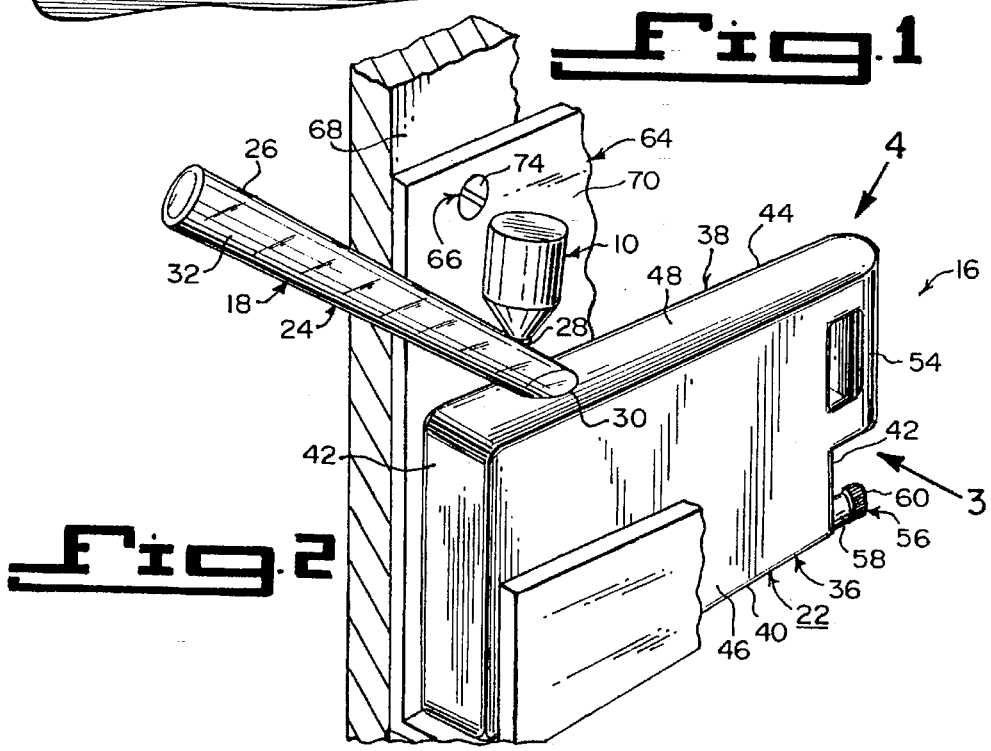
FIG. 2 is a front perspective view of the instant invention, in a portion of a J-shaped bracket on a wall draining and collecting oil/liquid residue from the inverted oil bottle of FIG. 1.
Figure 3:
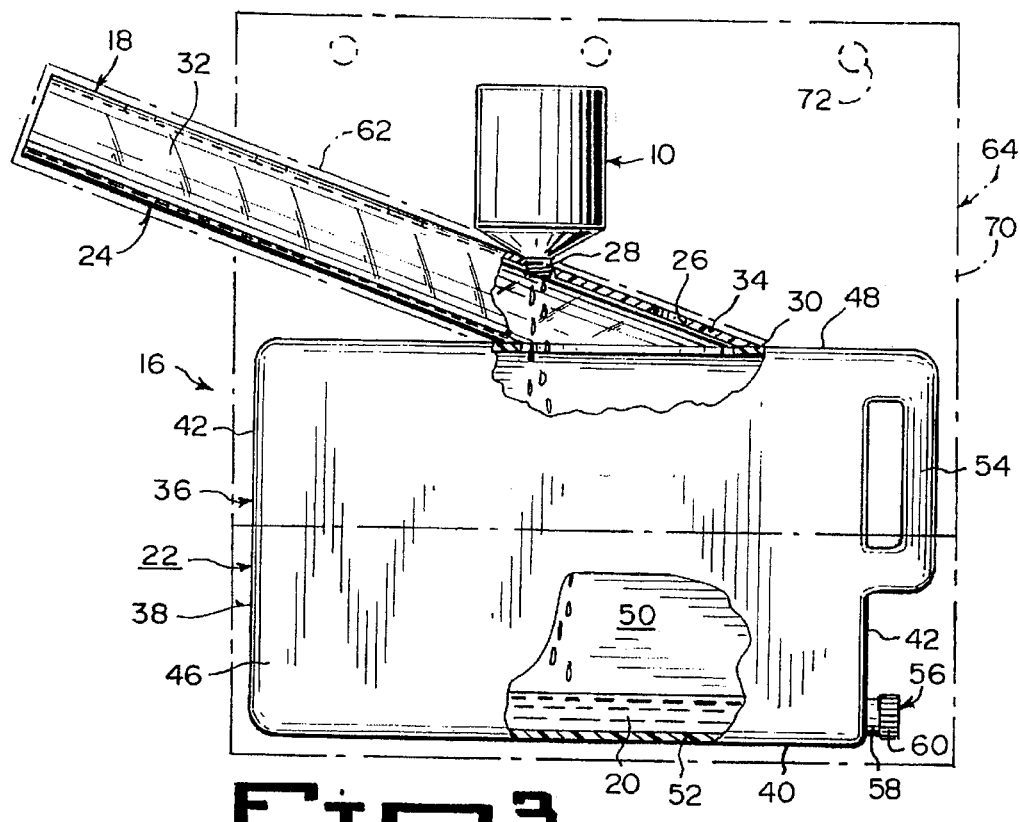
FIG. 3 is a front view with parts broken away and in section taken in the direction of arrow 3 in FIG. 2, with the J-shaped bracket and a protective sleeve both shown in phantom.
Figure 4:
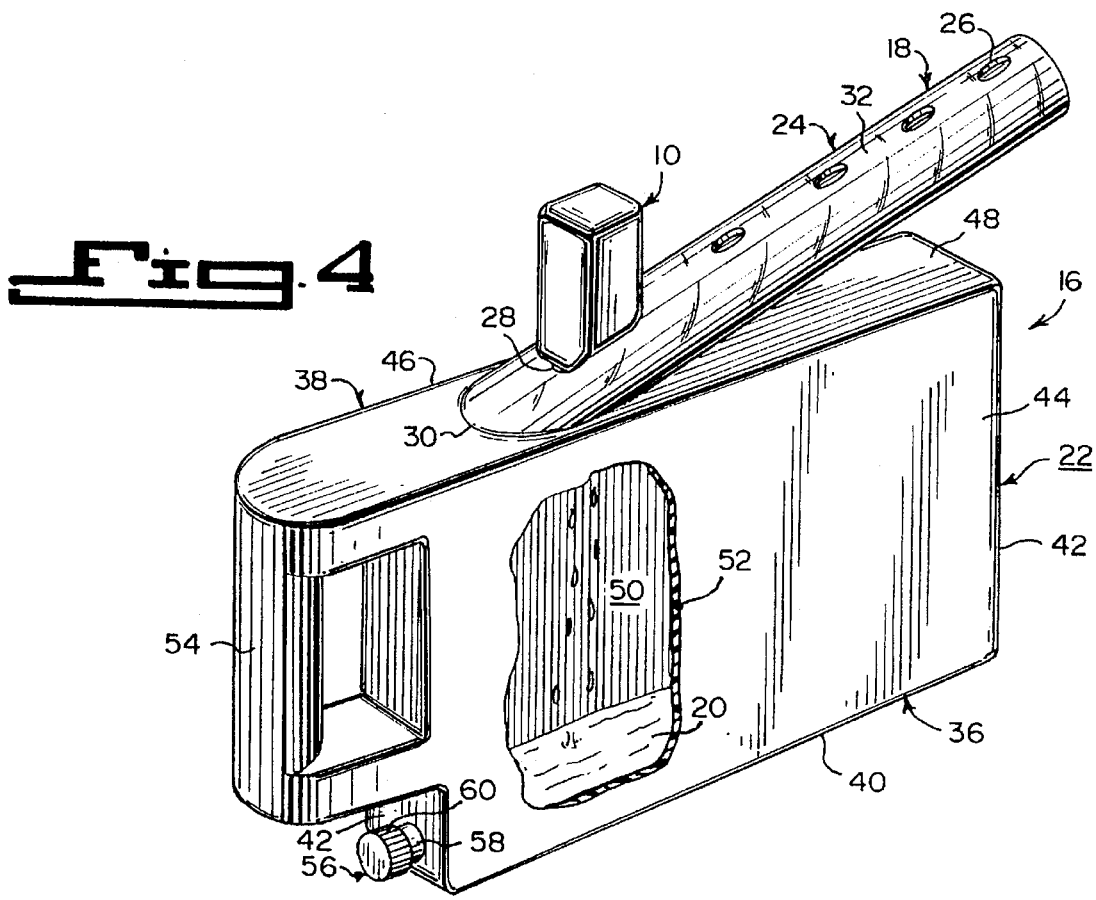
FIG. 4 is a rear perspective view with parts broken away and in section taken in the direction of arrow 4 in FIG. 2.

The instant invention shown in FIGS. 2 through 4, is an oil/liquid recovery system 16 comprising a structure 18 for draining from inverted bottles 10 some oil/liquid residue 20 remaining the bottles 10. A component 22 is for collecting the oil/liquid residue 20 existing from the draining structure 18 for future disposal thereof.

The draining structure 18 is a conduit 24, having a plurality of longitudinal spaced apart apertures 26. Each aperture 26 will receive one neck 28 of one of the inverted bottles 10. The conduit 24 is fluidly connected at one end 30 to the collecting component 22. The conduit 24 will extend at a gradual angle upwardly from the collecting component 22 with all of the apertures 26 on top, to allow all of the oil/liquid residue 20 entering the conduit 24 from the inverted bottles 10 to flow down into the collecting component 22.

The conduit 24 is an elongated hollow cylinder 32. The conduit 24 is fabricated out of plastic material 34. The collecting component 22 is a storage container 36. The storage container 36 is a rectangular narrow box-shaped receptacle 38, to retain the oil/liquid residue 20 therein.

The storage container 36 includes a bottom wall 40. A pair of side walls 42 extend upwardly from the bottom wall 40. A rear wall 44 extends upwardly from the bottom wall 40. A front wall 46 extends upwardly from the bottom wall 40. A top wall 48 extends over the bottom wall 40 and is connected to the side walls 42, the rear wall 44 and the front wall 46, thereby forming a sealed compartment 50, for holding the oil/liquid residue 20 therein. The collecting component 22 is fabricated out of plastic material 52.

The collecting component 22 includes a carry handle 54, so that the collecting component 22 can be transported by the carry handle 54. The collecting component 22 contains a tap assembly 56, so that the oil/liquid residue 20 can be poured out for removal therefrom.

The carry handle 54 is hollow and integral with the collecting component 22, so as to form a part of the collecting component 22. The tap assembly 56 includes a hollow neck 58, fluidly affixed to a lower portion of the collecting component 22. A removable cap 60 fits onto the hollow neck 58 in a sealed manner.

A protective sleeve 62, shown in phantom in FIG. 3, slides over the elongated hollow cylinder 32 to cover the apertures 26. The protective sleeve 62 will keep foreign objects out of the apertures 26, when not in use.

The oil/liquid recovery system 16, as shown in FIGS. 2 and 3, further includes a bracket 64 for holding the collecting component 22. Elements 66 are for mounting the bracket 64 to a flat vertical surface 68. The bracket 64 is a J-shaped housing 70. The mounting elements 66 consist of the bracket 64 having a plurality of holes 72 therethrough. A plurality of fasteners 74 are provided. Each fastener 74 extends through one hole 72 and into the flat vertical surface 68.

The bottle 10, as shown in all the figures, is an oil container. Other types of bottles can be used with the instant invention, such as bottles with liquid condiments like catsup, certain salad dressings and various sauces. Bottles with transmission fluids, brake fluids, coolant fluids, windshield cleaner fluids and household cleaning fluids can also be used in conjunction with the instant invention, so as to be properly disposed of.

LIST OF REFERENCE NUMBERS 10 inverted bottle
12 engine
14 motor vehicle
16 oil/liquid recovery system
18 draining structure
20 oil/liquid residue
22 collecting component
24 conduit for 18
26 aperture in 24
28 neck of 10
30 one end of 24
32 elongated hollow cylinder for 24
34 plastic material of 24

-continued

| LIST OF REFERENCE NUMBERS |
| --- |
| 36 storage container for 22 |
| 38 rectangular narrow box-shaped receptacle for 36 |
| 40 bottom wall of 36 |
| 42 side wall of 36 |
| 44 rear wall of 36 |
| 46 front wall of 36 |
| 48 top wall of 36 |
| 50 sealed compartment in 36 |
| 52 plastic material of 22 |
| 54 carry handle of 22 |
| 56 tap assembly |
| 58 hollow neck of 56 |
| 60 removable cap of 56 |
| 62 protective sleeve for 32 |
| 64 bracket |
| 66 mounting element |
| 68 flat vertical surface |
| 70 J-shaped housing for 64 |
| 72 hole in 64 |
| 74 fastener |

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An oil/liquid recovery system comprising:
   a) means for draining from inverted bottles some liquid residue remaining in the bottles comprising an elongated hollow cylinder having a plurality of aligned spaced apart apertures along the length of said cylinder, said apertures being sized to receive the open necks of said bottles;
   b) means for collecting the oil/liquid residue existing from said draining means for future disposal thereof comprising a storage container being a rectangular box-shaped receptacle with a horizontal bottom wall, vertical end walls and a horizontal top wall, said hollow cylinder having one end integral with and communicating with the interior of said storage container through the top wall thereof, said cylinder extending at a gradual angle upwardly from said top wall and closed at the other end with said apertures located along the top surface of said cylinder;
   c) bracket means for supporting said draining means on a flat vertical surface comprising a J-shaped housing having a flat plate being attached to said surface and a horizontal bottom member extending outwardly from said plate with an upwardly extending wall from the free end of said bottom member, said storage container resting on said bottom member and held in place by said upwardly extending wall;
   d) protective sleeve means of cylindrical shape conforming to the shape of said cylinder which slides over from the free end of and completely surrounds said cylinder for covering said apertures when said recovery system is not in use; and
   e) said container having on one end wall a hollow handle integral with and communicating with the interior of said container and a tap assembly below said handle for removing liquid collected by said container, said tap assembly comprising a hollow neck extending from the end wall and a removable cap that fits into said neck in a sealed manner.

\* \* \* \* \*